(12) United States Patent
Kapadia et al.

(10) Patent No.: US 11,970,653 B2
(45) Date of Patent: Apr. 30, 2024

(54) POLYMERIC BLEND COMPOSITE AND A PROCESS FOR PREPARING THE SAME

(71) Applicant: GHARDA CHEMICALS LIMITED, Maharashtra (IN)

(72) Inventors: Aditi S. Kapadia, Maharashtra (IN); Prakash D. Trivedi, Maharashtra (IN); Amol T. Patil, Maharashtra (IN); Arup R. Bhattacharyya, Maharashtra (IN)

(73) Assignee: GHARDA CHEMICALS LIMITED (IN)

( * ) Notice: Subject to any disclaimer, the term of this patent is extended or adjusted under 35 U.S.C. 154(b) by 961 days.

(21) Appl. No.: 16/968,285

(22) PCT Filed: Jan. 11, 2019

(86) PCT No.: PCT/IB2019/050210
§ 371 (c)(1),
(2) Date: Aug. 7, 2020

(87) PCT Pub. No.: WO2019/138361
PCT Pub. Date: Jul. 18, 2019

(65) Prior Publication Data
US 2021/0363398 A1     Nov. 25, 2021

(30) Foreign Application Priority Data
Jan. 12, 2018   (IN) .............................. 201821001494

(51) Int. Cl.
*C09K 5/14* (2006.01)
*B29B 9/06* (2006.01)
(Continued)

(52) U.S. Cl.
CPC .................. *C09K 5/14* (2013.01); *B29B 9/06* (2013.01); *C01B 32/174* (2017.08); *C08J 3/203* (2013.01);
(Continued)

(58) Field of Classification Search
CPC ........... C09K 5/14; B29B 9/06; C01B 32/174; C01B 2202/06; C01B 2202/24;
(Continued)

(56) References Cited

U.S. PATENT DOCUMENTS

2011/0311811 A1   12/2011   Collette et al.
2015/0080502 A1*   3/2015   Gharda .................. C08G 73/18
                                                                524/404

FOREIGN PATENT DOCUMENTS

WO        2013/164854       11/2013

OTHER PUBLICATIONS

Huang, Yan Yan et al., "Dispersion of CarbonNanotubes: Mixing, Sonication, Stabilization, and Composite Properties", Polymers. Jan. 23, 2012; pp. 275-295.
(Continued)

*Primary Examiner* — Andrew J. Oyer
(74) *Attorney, Agent, or Firm* — Whiteford, Taylor & Preston, LLP; Peter J. Davis

(57) ABSTRACT

The present disclosure relates to a polymeric blend composite comprising Poly Ether Ketone/Poly-(2,5-Benzimidazole) containing pre-treated multi walled carbon nanotubes (MWCNTs) between 0.5 to 5 wt % were melt processed on a twin-screw extruder and granules so obtained were injection molded to determine heat deflection temperature (HDT) of these composites and storage modulus using DMA. It was found that HDT and storage Modulus for so produced reinforced blends were unexpectedly extremely high as compared to PEK/ABPBI blends without MWCNTs.

17 Claims, 3 Drawing Sheets

Figure 1:
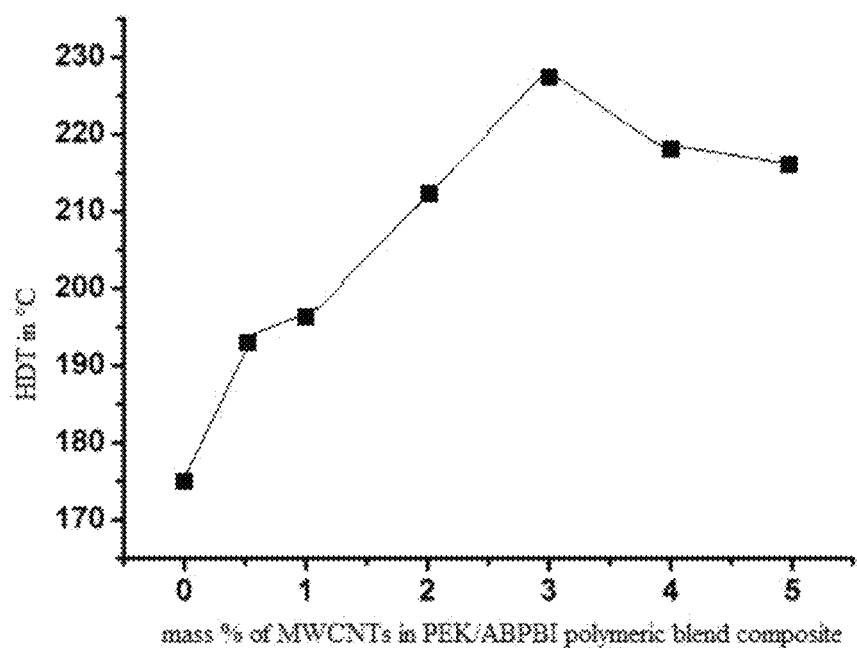

(51) Int. Cl.
*B29K 71/00* (2006.01)
*B29K 105/16* (2006.01)
*B29K 507/04* (2006.01)
*C01B 32/174* (2017.01)
*C08J 3/20* (2006.01)
*C08L 71/00* (2006.01)

(52) U.S. Cl.
CPC .......... *C08L 71/00* (2013.01); *B29K 2071/00* (2013.01); *B29K 2105/162* (2013.01); *B29K 2507/04* (2013.01); *B29K 2995/0005* (2013.01); *C01B 2202/06* (2013.01); *C01B 2202/24* (2013.01); *C01B 2202/34* (2013.01); *C01B 2202/36* (2013.01); *C01P 2002/74* (2013.01); *C08L 2201/08* (2013.01)

(58) Field of Classification Search
CPC ............ C01B 2202/34; C01B 2202/36; C01B 32/168; C08J 3/203; C08L 71/00; C08L 2201/08; C08L 71/02; B29K 2071/00; B29K 2105/162; B29K 2507/04; B29K 2995/0005; C01P 2002/74; C08G 73/18; B82Y 30/00

See application file for complete search history.

(56) References Cited

OTHER PUBLICATIONS

International Search Report issued in PCT/IB2019/050210 dated Mar. 7, 2019.

\* cited by examiner

POLYMERIC BLEND COMPOSITE AND A PROCESS FOR PREPARING THE SAME

FIELD OF THE DISCLOSURE

The present disclosure relates to a polymeric blend composite and a process for preparing the same.

BACKGROUND

Poly (ether ketone) (PEK), belongs to the family of high-performance semi-crystalline thermoplastic polymers known as polyaryletherketone (PAEKs) having excellent thermal properties, mechanical properties, good chemical resistance, low moisture absorption, and therefore can be used as high performance material for high-quality applications. Poly (ether ketone) generally has $T_g$ values in the range of 140-180° C., and melting temperature ($T_m$), in the range 300 to 400° C. These polymers are insoluble in most common solvents at room temperature, except for strong protonating acids such as concentrated sulfuric, hydrofluoric, methane sulfonic and trifluoro methane sulfonic acids.

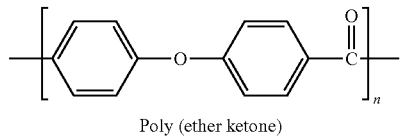

Poly (ether ketone)

Poly(2,5-benzimidazole) (ABPBI), represented by the molecular formula $(C_7H_4N_2)_n$, is insoluble in water, organic solvents, and does not have a melting temperature. ABPBI cannot be melt-processed up to 520° C., due to its high glass transition temperature ($T_g$) of 485° C. and the absence of $T_m$ up to 600° C. Poly (2, 5-benzimidazole) tends to decompose before melting. ABPBI is also highly resistant to most chemicals. In spite of possessing exceptional properties, it has not been fully explored as a polymer due to the difficulty in its processing. It is typically used as a solution cast membrane and has been evaluated as phosphoric acid impregnated proton exchange fuel cell membrane.

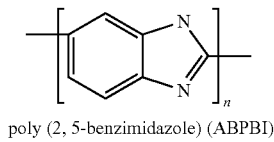

poly (2, 5-benzimidazole) (ABPBI)

Typically, ABPBI is blended with binders, such as PEK, to make it processable. The blend of PEK and ABPBI thus formed has the properties of high performance material, and extremely high temperature stability. Further the drawback of degradation of ABPBI is also eliminated.

However, the heat deflection temperature (HDT), and the DC electrical conductivity of PEK/ABPBI blend is low. Further, uniform blending of the PEK/ABPBI blend is difficult to achieve, which affects the stability of the obtained PEK/ABPBI blend.

There is, therefore, felt a need for PEK/ABPBI blends that mitigates the hereinabove mentioned drawbacks.

OBJECTS

Some of the objects of the present disclosure, which at least one embodiment herein satisfies, are as follows.

It is an object of the present disclosure to ameliorate one or more problems of prior art and to provide a useful alternative.

Another object of the present disclosure is to provide a polymeric blend composite of PEK, ABPBI, with added MWCNTs.

Another object of the present disclosure is to provide a polymeric blend composite of PEK, ABPBI, and MWCNTs having high HDT.

Still another object of the present disclosure is to provide a polymeric blend composition of PEK/ABPBI/MWCNTs with higher storage modulus reflecting higher rigidity at higher temperatures than PEK alone or PEK/ABPBI blend.

Yet another object of the present disclosure is to provide a stable polymeric blend composite of PEK, ABPBI, and MWCNTs.

An added object of the present disclosure is to use PEK/ABPBI blend containing up to 5% MWCNTs.

Still another object of the present disclosure is to provide a process for producing a polymeric blend composite of PEK/ABPBI/MWCNTs and injection mold or compression mold or extrude these to give useful articles.

Other objects and advantages of the present disclosure will be more apparent from the following description, which is not intended to limit the scope of the present disclosure.

SUMMARY

The present disclosure provides a polymeric blend composite. The polymeric blend composite comprises PEK having an inherent viscosity in the range of 0.60 to 1.80 dL/g, ABPBI having an inherent viscosity in the range of 0.90 to 4.00 dL/g and 0.5 to 5 wt % pre-treated multi walled carbon nanotubes (MWCNTs). The ratio of PEK to ABPBI in the polymeric blend composite can be in the range of 60:40 (wt/wt) to 90:10 (wt/wt). The polymeric blend composite is characterized by having improved heat deflection temperature (HDT) in the range of 170° C. to 240° C. and improved storage modulus in the range of 150 MPa to 5000 MPa at ambient temperature, and 150 MPa to 400 Mpa at 300° C.

The present disclosure further provides a process for preparing a polymeric blend composite. The process comprises pre-treating MWCNTs to obtain individualized, non-aggregated MWCNTs, and mixing PEK, ABPBI, and the pre-treated MWCNTs to obtain a powder dry blend. The powder dry blend is extruded to obtain granules followed by injection molding or by other processing methods for preparation of useful articles. The molded specimens so prepared are evaluated for HDT and storage modulus.

BRIEF DESCRIPTION OF THE ACCOMPANYING DRAWING

Figure 2A:
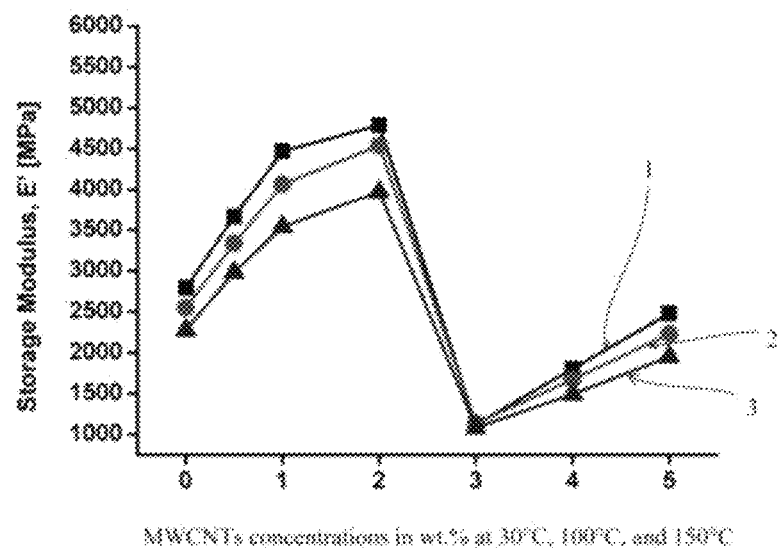
Figure 2B:
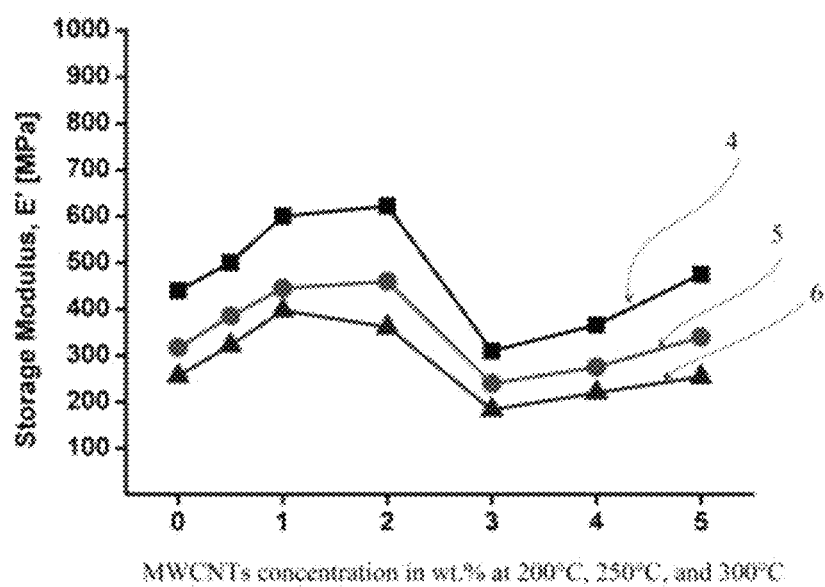

The present disclosure will now be described with the help of the accompanying drawing, in which:

FIG. 1 illustrates a graphical representation of HDT in ° C. versus mass % of MWCNTs in PEK/ABPBI polymeric blend composite with different mass percentages of MWCNTs in the polymer blend composite;

FIG. 2a represents a graph illustrating the storage modulus of the polymeric blend composite having varying concentration of MWCNTs at different temperatures (30° C., 100° C., and 150° C.) in accordance with the present disclosure; and FIG. 2b represents a graph illustrating the storage modulus of the polymeric blend composite having a varying concentration of MWCNTs at different and higher temperatures (200° C., 250° C., and 300° C.) in accordance with the present disclosure.

DETAILED DESCRIPTION

Currently, the blends of PEK/ABPBI have properties related to high performance material and efficient processing of ABPBI, when blended with binders, such as PEK. However, the HDT and the storage modulus or rigidity of the known PEK/ABPBI blends is low, restricting their use in high end applications.

Therefore, the present disclosure envisages a PEK/ABPBI polymeric blend composite with MWCNTs having high HDT, high rigidity, and higher stability.

In an aspect of the present disclosure, there is provided a polymeric blend composite of polyether ketone/poly(2,5-benzimidazole) (PEK/ABPBI) containing a nanomaterial. The polymeric blend composite comprises PEK, ABPBI, and specially MWCNTs. In an embodiment, the nanomaterial is pre-treated multi-walled carbon nanotubes (MWCNTs).

In accordance with the embodiments of the present disclosure, the ratio of PEK to ABPBI can be in the range of 60/40 to 90/10 (wt/wt). In an embodiment, the ratio of PEK/ABPBI is 80/20 (wt/wt). Poly(ether ketone) and Poly (2, 5-benzimidazole) (ABPBI) when blended has properties related to high performance material and efficient processing. However, properties such as, heat deflection temperature (HDT), storage modulus, and the rigidity of known PEK/ABPBI blends are not of the desired level, restricting their use in high end applications such as connectors, thermal interface materials, heat sinks, electronics packaging, self-regulating heaters, PTC resistors, and in transport industry.

Therefore, the present disclosure envisages a PEK/ABPBI polymeric blend composite having comparatively high HDT, high rigidity, and improved stability.

In one aspect of the present disclosure, there is provided a polymeric blend composite. The polymeric blend composite comprises PEK having an inherent viscosity in the range of 0.60 to 1.80 dL/g, ABPBI having an inherent viscosity in the range of 0.90 to 4.00 dL/g and 0.5 to 5 wt % pre-treated multi walled carbon nanotubes (MWCNTs).

In one embodiment of the present disclosure, the inherent viscosity of the poly (ether ketone) is in the range of 0.70 to 1.2 dL/g. The weight average molecular weight ($M_w$) of the PEK can be in the range of 60,000 to 1,20,000.

PAEKs are high performance semi-crystalline thermoplastic polymers having thermal and mechanical properties. Further, PAEKs have good chemical resistance and low moisture absorption, due to which the PAEKs are used as important material in various applications. PAEKs have the glass transition temperature (Tg) in the range of 140-180° C. and the melting temperature in the range of 300° C. to 395° C. Due to these properties PAEKs can be transformed from the melt to glassy or semi-crystalline state depending on the cooling conditions. The temperature conditions affect the mechanical properties of PAEK's e.g., impact resistant, yield stress, and fracture toughness.

ABPBI is a solid, odorless, reddish brown colored thermosetting polymer having a specific gravity in the range of 1.29 to 1.30. It is insoluble in water and organic solvents even at high temperatures and do not have a melting temperature. ABPBI alone cannot be melt processed up to 520° C. due to its high glass transition temperature ($T_g$) of 485° C. and the absence of $T_m$ up to 600° C.

In accordance with the present disclosure, in one embodiment, the inherent viscosity of ABPBI is in the range of 1.00 to 4.00 dL/g. The bulk density of ABPBI can be in the range of 0.20 to 0.30.

Typically, the ratio of the PEK to the ABPBI can be in the range of 60/40 to 95/5. In one embodiment of the present disclosure, the ratio of the PEK to ABPBI in the polymeric blend composite is 80/20.

Multi-walled carbon nanotubes (MWCNTs) in their disentangled and individualized state have tensile strength up to 100 GPa; and exhibits high aspect ratio, resistance to high temperature (beyond 500° C.), high strength to weight ratio (due to their low density), chemical stability, and thermal conductivities greater then copper and diamond. In accordance with the present disclosure the diameter of the MWCNTs can be in the range of 8 nm to 20 nm. The length of the MWCNTs can be in the range of 0.05 to 15 micron (μm). Preferably, the length of the MWCNTs can be in the range of 0.1 to 10 micron (μm), and the diameter of the MWCNTs can be in the range of 8 nm to 14 nm. In one embodiment of the present disclosure the amount of MWCNTs is 3 wt % and in another embodiment, it is 1 wt %. Typically, the purity of the MWCNTs used in the polymeric blend composite of the present disclosure is greater than 90%, which corresponds to $I_D/I_G$=0.929 ($I_D$ refers to the intensity of the disordered D-band and $I_G$ refers to the intensity of the ordered G-band).

In one embodiment of the present disclosure, a milled Carbon Fiber (MCF) with fiber length 100 μm, 350 g/l bulk density and filament diameter (yarn) of 7 μm is used to reinforce PEK and ABPBI (80/20 blend). The product obtained was an MCF blend composite. In one embodiment, the amount of the MCF used is 3 wt %.

In an exemplary embodiment of the present disclosure, the polymeric composite of the present disclosure comprises PEK and ABPBI in the ratio of 80/20 and 3 wt % MWCNTs.

The polymeric blend composite of the present disclosure is characterized by having a heat deflection temperature (HDT) in the range of 170° C. to 240° C., and a storage modulus in the range of 2000 MPa to 5000 MPa at ambient temperature and of 250 MPa to 400 MPa at 300° C.

In another aspect of the present disclosure, there is provided a process for preparing a polymeric blend composite comprising PEK, ABPBI, and MWCNTs. The process comprises pre-treatment of the MWCNTs to obtain the pre-treated MWCNTs. The PEK, ABPBI, and the pre-treated MWCNTs are then mixed to obtain a processable blend. The so obtained blend is extruded to obtain the polymeric blend composite of the present disclosure.

MWCNTs tend to agglomerate, making it difficult to control the dispersion of the MWCNTs in the polymer blend composite. It is well known that without dispersion, the blend properties are not significantly improved. Therefore, the MWCNTs used in the polymeric blend composite of the present disclosure are pre-treated by ultrasonication to overcome the problem of agglomeration. The MWCNTs, when dispersed in the polymeric blends, show high rigidity at higher temperatures when properly integrated into the polymeric blend to form a composite structure, as the degree of entanglement and the linearity of the MWCNTs also impact the performance of the polymeric blend composite.

In accordance with the present disclosure, the MWCNTs are pre-treated by initially dispersing it in de-ionized water by ultrasonication. Ultrasonicator generates sound waves of high frequencies in the range of 15 to 25 kilohertz (kHz). The sound waves generated, subsequently create 'bubbles', which agitate the MWCNTs present in the ultrasonication chamber. The MWCNTs are typically ultrasonicated for a time period in the range of 10 to 60 minutes at ambient temperatures. Subjecting the MWCNTs to ultrasonication reduces the cluster formation (agglomeration) and provides uniformly dispersed MWCNTs. The so obtained uniformly dispersed MWCNTs is dried at a temperature in the range of 20° C. to 120° C. for a time period in the range of 1 hour to 48 hours under vacuum in the range of 1 to 762 mm of Hg, to obtain the pre-treated MWCNTs. The pre-treated MWCNTs are used in the preparation of the polymeric blend composite.

In an embodiment, a pre-determined amount of powdered PEK and ABPBI are dry mixed with the pre-treated MWCNTs, to obtain a mixture. The mixing can be carried out using any mixer, such as a high speed mixer.

In accordance with the embodiments of the present disclosure, the ratio of PEK to ABPBI can be in the range of 60/40 (wt/wt) to 95/5 (wt/wt) ratios. In one embodiment, the ratio of PEK to ABPBI is 80/20 (wt/wt). The amount of MWCNTs added to PEK/ABPBI dry blend is in the range of 0.5 wt % to 5 wt % of the total mass of the polymeric blend composition. The blend mixture further is extruded to obtain strands of the polymeric blend composites of the present disclosure. The extrusion can be carried out in known extruders, such as twin screw extruder. Twin screw extruders typically provide a high shear rate.

Extruding the obtained blends using twin screw extruder tends to prevent agglomeration of the pre-treated MWCNTs in the polymeric blend composite.

The speed of extruder screws can be in the range of 350 rpm to 1200 rpm. The extrusion can be carried out at a temperature in the range of 300° C. to 450° C. The process of extrusion comprises feed zone, compression zone, metering zone, and die. Further, temperature of feed zone can be typically in the range of 320° C. to 340° C., compression zone temperature can be in the range of 340° C. to 375° C., and metering zone temperature can be in the range of 375° C. to 430° C., and die temperature can be in the range of 380° C. to 450° C. The length to diameter (L/D) ratio of the extruder can be in the range of 25 to 35. In one embodiment, the L/D ratio of the extruder is 30.

The polymeric blend composite can be further processed to produce granules. In an embodiment, the extruded strands of the polymeric blend composite can be quenched in water and pelletized, which can then be dried in an oven at a temperature in the range of 150° C. to 200° C. for a time period of 1 to 5 hours to obtain dried pellets.

Injection Molding can be carried out in an Injection Molding machine in the temperature range of 350° C. to 450° C.

The polymeric blend composites containing MWCNTs obtained by the process of the present disclosure exhibit high HDT and improved storage modulus as compared to the polymeric blends comprising PEK and ABPBI.

The polymeric blend composite of the present disclosure can find applications as connectors, thermal interface materials, heat sinks, electronics packaging, self-regulating heaters, FTC resistors, in transport industry especially in aerospace structures, which require a reduction in weight and fuel consumption. These composites can also be used in aeronautical structural components like wing panels, horizontal and vertical stabilizers and some elements of the fuselage. The applications of the polymeric blend composite thus formed is not restricted its use only to the aforestated applications but can find in applications in various other sectors where high performance and high temperature resistant is required.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAIL

Experiment 1: Preparation of PEK/ABPBI Blends (PEK/ABPBI 80/20 wt/wt Ratio) and with Multi-Walled Carbon Nanotubes in Accordance with the Present Disclosure Step-I: Pre-Treatment of MWCNTs The MWCNTs used in the experiments were Arkema Graphistrength C100.

110 grams of MWCNTs were mixed with 3670 ml of de-ionized water and ultrasonicated (Ultrasonicator ANM Alliance) at a frequency of 20 kilohertz (kHz) for a time period of 20 minutes. After ultrasonication, uniformly dispersed MWCNTs were obtained. The so obtained uniformly dispersed MWCNTs were dried at 80° C. 108.5 grams pre-treated MWCNTs were obtained.

Step-II: Preparation of the PEK/ABPBI/MWCNTs Polymeric Blend Composite 544 grams of PEK powder, 136 grams of ABPBI powder (in ratio 80:20), and 21 grams (3 wt %) of pre-treated MWCNTs as obtained in Step-I were mixed in a high speed mixer rotating at 2000 rpms for 20 minutes to obtain an apparent homogeneous mixture. This mix was extruded using a twin screw extruder (Steer Alpha 18 Extruder, L/D ratio 32) at 400 rpm with barrel zones temperatures of 320-395° C., and die temperature of 400-450° C. to obtain the polymeric blend composite in the form of strands, which were quenched in water and further pelletized (Glaves Corporation pelletizer), followed by drying at 180° C. for 3 hours.

The pellets were molded (Arburg All Rounder 320C injection molding machine) at 1400 bar injection pressure and 1200 bar holding pressure and dosage volume of 25 cc and injection flow of 35 cc/s to obtain molded samples.

Experiment 2

The similar procedure as given in experiment 1 was followed, except 0.5 wt % of MWCNTs was mixed to obtain the polymeric blend composite. The HDT of this composition is 193° C.

Experiment 3

The similar procedure as given in experiment 1 was followed except 1 wt % of MWCNTs was mixed to obtain the polymeric blend composite, giving HDT of 196° C.

Experiment 4

The similar procedure as given in experiment 1 was followed except 2 wt % of MWCNTs was mixed to obtain the polymeric blend composite, giving HDT of 212° C. of molded samples.

Experiment 5

The similar procedure as given in experiment 1 was followed except 4 wt % of MWCNTs was mixed to obtain the polymeric blend composite with HDT of 219° C.

Experiment 6

The similar procedure as given in experiment 1 was followed except 5 wt % of MWCNTs was mixed to obtain the polymeric blend composite, which gave HDT of 216° C.

Experiment 7

The similar procedure as given in experiment 1 was followed except 408 grams of PEK, 272 grams of ABPBI (60:40 wt/wt) and 3 wt % of MWCNTs was mixed to obtain the polymeric blend composite of PEK/ABPBI giving HDT of 188° C.

Experiment 8

The similar procedure as given in experiment 1 was followed without adding MWCNTs to 544 grams PEK and 136 grams ABPBI to obtain a neat blend of PEK/ABPBI (80:20 wt/wt). This neat composition showed HDT of 174° C.

Experiment 9

The similar procedure as given in experiment 1 was followed without adding MWCNTs to 420 grams PEK and 280 grams ABPBI to obtain a neat blend of PEK/ABPBI (60:40 wt/wt). This neat composition showed HDT of 174° C.

Experiment 10

The similar procedure as given in experiment 1 was followed by adding 3 wt % MCFs (Milled Carbon Fibre Tenax A HT M100 of fiber length 100 μm, 350 g/l bulk density and filament diameter (yarn) of 7 μm) instead of MWCNTs to 407.4 grams PEK and 271.6 grams ABPBI to obtain a blend of PEK/ABPBI (80:20 wt/wt). This composition exhibited an HDT of 184° C. MCF is conventional reinforcing agent used in polymers. It was found that while addition of 3 wt % of MWCNTs increased HDT by 31.3%, whereas addition of 3 wt % of MCF only 5.7 wt % increase in HDT was registered. Hence, to obtain 31.3% increase in HDT, far more than 3 wt % MCF would be required to be added to PEK/ABPBI (80:20 wt/wt) blend.

The polymeric blend composite of the present disclosure exhibits improved HDT in the range of 0.5% to 35% as compared to PEK/ABPBI blends without MWCNTs, which is given in Table 1.

TABLE 1

HDT of polymeric blend composite

| Sr. No. | Polymer | Arkema Graphistrength C100 MWCNTs wt % | HDT ° C. | Increase in HDT with respect to neat blend % |
|---|---|---|---|---|
| 1 | PEK/ABPBI(80:20) | 3 | 228.5 | 31.3 |
| 2 | PEK/ABPBI(80:20) | 0.5 | 193 | 10.9 |
| 3 | PEK/ABPBI(80:20) | 1 | 196 | 12.6 |
| 4 | PEK/ABPBI(80:20) | 2 | 212 | 21.8 |
| 5 | PEK/ABPBI(80:20) | 4 | 219 | 25.8 |
| 6 | PEK/ABPBI(80:20) | 5 | 216 | 19.4 |
| 7 | PEK/ABPBI (60:40) | 3 | 188 | 8.0 |
| 8 | PEK/ABPBI(80:20) (neat blend) | 0 | 174 | 0 |
| 9 | PEK/ABPBI (60:40) | 0 | 174 | 0 |
| 10 | PEK/ABPBI (80:20) | 3 (MCF) | 184 | 5.7 |

It is evident from Table-1 that the rise in HDT is in the range of 9 to 33% for the polymeric blend composite which contains MWCNTs in the range of 0.5 to 5 wt %. Further, the addition of 3 wt % of MWCNTs show increased HDT by 31.3% whereas addition of 3 wt % of MCF provides only 5.7% increase in the HDT. The highest HDT is observed when the PEK/ABPBI ratio was 80:20. 31 to 33% increase in HDT is obtained when 3 wt % MWCNTs was used in the polymeric blend composite as compared to only 5.7% increase in the HDT, when 3 wt % MCF was used in the polymeric blend composite.

Experiments 11

The polymeric blend composites of the present disclosure, the neat blend, and a polymeric blend comprising 0-5 wt % MWCNTs were tested for storage modulus. Storage Modulus was obtained using TA System DMA equipment in the temperature range of 30° C. to 350° C. The method used for testing was ASTM D 7028 at Frequency was set at 1 Hertz (Hz). Amplitude was set at 50 μm. The results obtained are summarized in Table-2.

FIG. 2a represents a graph illustrating the storage modulus (E') of the polymeric blend composite (PEK/ABPBI 80:20 wt/wt) of the present disclosure having varying concentration of MWCNTs from 0.5 wt % to 5 wt % at different temperatures. Line 1 represents storage modulus at 30° C., Line 2 represents storage modulus at 100° C., and Line 3 represents storage modulus at 150° C. It is seen from FIG. 2a that an improved storage modulus (corresponding to minimum internal stress) is obtained when 3 wt % MWCNTs was used in the polymeric blend composite.

FIG. 2b represents a graph illustrating the storage modulus (E') of the polymeric blend composite (PEK/ABPBI 80:20 wt/wt) of the present disclosure having varying concentration of MWCNTs from 0.5 wt % to 5 wt % at different temperatures. Line 4 represents storage modulus at 200° C., Line 5 represents storage modulus at 250° C., and Line 6 represents storage modulus at 300° C. It is seen from FIG. 2b that a minimum storage modulus (corresponding to minimum internal stress) is obtained when 3 wt % MWCNTs was used in the polymeric blend composite.

TABLE 2

Storage Modulus (E') of PEK/ABPBI (80/20) blends at different temperatures for MWCNTs concentrations 0-5 wt %

| Sample Name | | Storage Modulus (MPa) at different temperatures (° C.) | | | | | |
|---|---|---|---|---|---|---|---|
| PEK/ABPBI Ratio | MWCNTs (wt %) | 30 | 100 | 150 | 200 | 250 | 300 |
| PEK/ABPBI (80:20) (neat blend) | 0 | 2790 | 2550 | 2275 | 440 | 317 | 256 |
| PEK/ABPBI (80:20) | 0.5 | 3665 | 3335 | 2980 | 500 | 385 | 322 |
| PEK/ABPBI (80:20) | 1 | 4470 | 4065 | 3540 | 600 | 445 | 397 |
| PEK/ABPBI (80:20) | 2 | 4790 | 4540 | 3970 | 622 | 460 | 361 |
| PEK/ABPBI (80:20) | 3 | 1120 | 1135 | 1080 | 310 | 240 | 183 |
| PEK/ABPBI (80:20) | 4 | 1805 | 1670 | 1490 | 366 | 275 | 220 |
| PEK/ABPBI (80:20) | 5 | 2479 | 2230 | 1950 | 475 | 340 | 254 |

It is observed from Table-2 that the polymeric blend composite of the present disclosure having PEK/ABPBI 80:20 (wt/wt) with 3 wt % of MWCNTs exhibited improvement in storage modulus, indicating a decrease in stress as compared to the neat blend (PEK/ABPBI without MWCNTs).

It is seen that the polymeric blend composite comprising PEK/ABPBI in the ratio of 80:20 (wt/wt), and 3 wt % MWCNTs exhibited an improvement in HDT in the range of 30% to 33% and improved storage modulus as compared to a polymeric blend of PEK/ABPBI without MWCNTs.

Technical Advancements

The present disclosure described herein above has several technical advantages including, but not limited to, the realization of polymeric blend composites having high HDT and improved storage modulus.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions, and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A polymeric blend composite comprising;
    a. a poly(ether ketone) having an inherent viscosity in the range of 0.60 to 1.80 dL/g;
    b. poly(2,5-benzimidazole) having an inherent viscosity in the range of 0.90 to 4.00 dL/g;
    c. 0.5 wt % to 5 wt % of pre-treated multi walled carbon nanotubes (MWCNT);
    wherein the ratio of said poly (ether ketone) to said poly (2,5-benzimidazole) is in the range of 60:40 to 90:10 wt/wt; and
    wherein said polymeric blend composite is characterized by:
        heat deflection temperature (HDT) in the range of 170° C. to 240° C.; and
        storage modulus in the range of 150 to 5000 MPa at a temperature in the range of 20° C. to 350° C.

2. The polymeric blend composite as claimed in claim 1, wherein the ratio of said poly (ether ketone) to said poly (2, 5-benzimidazole) is 80:20 (wt/wt).

3. The polymeric blend composite as claimed in claim 1, wherein the weight average molecular weight ($M_w$) of said poly(ether ketone) is in the range of 80,000 to 110,000.

4. The polymeric blend composite as claimed in claim 1, wherein the inherent viscosity of said poly (ether ketone) is in the range of 0.70 to 1.2 dL/g.

5. The polymeric blend composite as claimed in claim 1, wherein the inherent viscosity of said poly (2, 5-benzimidazole) is in the range of 1.00 to 3.00 dL/g.

6. The polymeric blend composite as claimed in claim 1, wherein the bulk density of said poly (2, 5-benzimidazole) is in the range of 0.20 g/cm$^3$ to 0.30 g/cm$^3$.

7. The polymeric blend composite as claimed in claim 1, wherein the diameter of said pre-treated multi walled carbon nanotubes is in the range of 8 nm to 20 nm and the length of said pre-treated multi walled carbon nanotubes is in the range of 0.1μ to 10μ.

8. The polymeric blend composite as claimed in claim 1, wherein said pre-treated multi walled carbon nanotubes have an $I_D/I_G$ values in the range of 0.9 to 1.0.

9. The polymeric blend composite as claimed in claim 1, wherein said HDT is in the range of 174° C. to 228.5° C.

10. The polymeric blend composite as claimed in claim 1, wherein said storage modulus at ambient temperature is in the range of 2790 MPa to 4790 Mpa.

11. The polymeric blend composite as claimed in claim 1, wherein said storage modulus at 300° C. is in the range of 250 MPa to 400 MPa.

12. The polymeric blend composite as claimed in claim 1, wherein the MWCNTs are in the range of 1.0 wt % to 3 wt %.

13. The polymeric blend composite as claimed in claim 1, wherein the ratio of PEK/ABPBI is in the range of 60/40 to 80/20 by weight %.

14. The polymeric blend composite as claimed in claim 1, wherein the composite contains 3 wt % MWCNTs.

15. The polymeric blend composite as claimed in claim 1, wherein said composite is in the form of pellets.

16. A process for preparing said polymeric blend composite as claimed in claim 1, said process comprising the following steps:
   a) pre-treating multi walled carbon nanotubes to obtain pre-treated multi walled carbon nanotubes;
   b) mixing a poly(ether ketone), poly (2,5-benzimidazole), and said pre-treated multi walled carbon nanotubes to obtain a powder dry blend; and
   c) extruding said powder dry blend at a temperature in the range of 300° C. to 450° C. to obtain said polymeric blend composite in the form of extrudates and subsequently pelletizing these extruded strands.

17. The process as claimed in claim 16, wherein said pre-treatment of said multi walled carbon nanotubes comprises the following steps:
   i. ultrasonicating said multi walled carbon nanotubes at a frequency in the range of 15 to 25 kilohertz for a time period in the range of 10 minutes to 60 minutes to obtain uniformly dispersed multi walled carbon nanotubes; and
   ii. drying said uniformly dispersed multi walled carbon nanotubes at a temperature in the range of 20° C. to 120° C. for a time period in the range of 1 hour to 48 hours under vacuum in the range of 1 to 700 mm of Hg to obtain said pre-treated multi walled carbon nanotubes.

\* \* \* \* \*